United States Patent
Keating et al.

(10) Patent No.: US 8,607,952 B2
(45) Date of Patent: Dec. 17, 2013

(54) ALUMINUM CLUTCH HOUSING FOR A FRICTION CLUTCH WITH A PISTON POCKET AND A SPLINE LINER

(75) Inventors: Martin P Keating, Plainfield, IL (US); Kenneth C Yuergens, Farmington Hills, MI (US); Yosuke Kimpara, Fukuroi (JP); Keith Honkala, Shelby Township, MI (US)

(73) Assignee: BorgWarner, Inc., Auburn Hills, MI (US)

(*) Notice: Subject to any disclaimer, the term of this patent is extended or adjusted under 35 U.S.C. 154(b) by 358 days.

(21) Appl. No.: 13/037,470

(22) Filed: Mar. 1, 2011

(65) Prior Publication Data

US 2011/0315505 A1    Dec. 29, 2011

Related U.S. Application Data

(60) Provisional application No. 61/357,782, filed on Jun. 23, 2010.

(51) Int. Cl.
*F16D 13/62* (2006.01)
*F16D 13/68* (2006.01)

(52) U.S. Cl.
USPC .......................... 192/70.2; 192/112

(58) Field of Classification Search
USPC .......................... 192/70.2; 74/449
See application file for complete search history.

(56) References Cited

U.S. PATENT DOCUMENTS

| 1,172,146 | A |   | 2/1916 | Loomis |
|---|---|---|---|---|
| 1,683,806 | A | * | 9/1928 | Richards, Jr. .................. 192/115 |
| 3,191,735 | A |   | 6/1965 | Wavak |
| 4,574,449 | A |   | 3/1986 | Wussow |
| 5,803,222 | A |   | 9/1998 | Arndt |
| 6,272,725 | B1 |   | 8/2001 | Stout, Jr. |
| 6,637,574 | B2 |   | 10/2003 | Landa et al. |
| 7,007,783 | B2 | * | 3/2006 | Gerathewohl et al. ........ 192/70.2 |
| 7,287,632 | B1 | * | 10/2007 | Taylor ........................ 192/70.19 |
| 7,383,932 | B2 | * | 6/2008 | Miyazaki et al. ............. 192/70.2 |

FOREIGN PATENT DOCUMENTS

| DE | 2608348 | 9/1976 |
|---|---|---|
| FR | 412399 | 7/1910 |

* cited by examiner

*Primary Examiner* — Rodney Bonck
(74) *Attorney, Agent, or Firm* — Helmholdt Law PLC; Thomas D. Helmholdt

(57) ABSTRACT

A clutch has an outer aluminum housing and an inner housing arranged coaxially with respect to one another to support a plurality of first and second alternating, interiorly arranged, radially extending, friction members for axial movement between engaged and disengaged positions. The outer aluminum housing can have a cylindrical side wall and a radially inwardly extending end wall. A plurality of spline teeth can be formed at angularly spaced locations along the cylindrical side wall. Each spline tooth can have radial wall portions extending inwardly and longitudinally terminating at a circumferential wall portion extending between the radial wall portions to define the spline teeth. A sheet metal liner can be wrapped around to form a continuous, generally cylindrical, corrugated ring with inwardly extending spline teeth covers connected to a collar.

16 Claims, 4 Drawing Sheets

ALUMINUM CLUTCH HOUSING FOR A FRICTION CLUTCH WITH A PISTON POCKET AND A SPLINE LINER

CROSS-REFERENCE TO RELATED APPLICATIONS

This application is a continuation and claims the benefit under 35 U.S.C. §119 (e) of U.S. Provisional Patent Application Ser. No. 61/357,782 filed on Jun. 23, 2010, which is incorporated by reference herein in its entirety.

FIELD OF THE INVENTION

The invention relates to a power-transmitting clutch using friction or interlocking parts for securing and releasing driving continuity as between two shafts, or a pulley and a shaft, or other driving and driven parts.

BACKGROUND

A power-transmitting clutch can include an input shaft and an output shaft rotatable about a common axis. At least three members can be supported thereby in an array of adjacent members spaced along the axis and co-axial with the shafts. The outer of the members can have surfaces facing opposite surfaces of one or more intermediate members. One of the members can be constrained to rotate with one of the shafts, while another of the members can be constrained to rotate with the other of the shafts while being movable along the common axis. The clutch can also have a mechanism for moving the members toward one another for mutual engagement of the facing surfaces, whereby the input shaft transmits rotation to the output shaft when the facing surfaces are mutually engaged. The mechanism can transmit rotational force from an input shaft to a member supported thereby, or can transmit rotational force from another member to an output shaft that supports the other member. The mechanism simultaneously permits movement of either member relative to the corresponding supporting shaft. The mechanism can include portions integral with or secured to either shaft extending along or parallel to the axis of rotation thereof which portions connect the member to the corresponding supporting shaft for rotation and permit movement only in a direction parallel to the axis. The portions of the mechanism can include gear-like teeth and grooves in the shaft or drum mating with complementary grooves and teeth in the member, which can also be described as ribs or slots in the shaft or drum mating with complementary slots and protrusions in the member. A plurality of first members can be in torque-transmitting connection with an input shaft, a plurality of second members can be in torque-transmitting connection with an output shaft coaxial with the input shaft, and wherein the first and second members alternate with one another along the axis of the shafts.

SUMMARY

A clutch housing or disc carrier can be made from aluminum material with a circumferential side wall having a plurality of spline teeth arranged in angularly spaced apart locations and disposed extending along a longitudinal axis of the housing. The clutch housing or disc carrier can also have a radially inwardly extending end wall. A sheet metal liner can be provided to protect the spline teeth of the aluminum housing. The liner can be operatively arranged to accept at least a portion of a clutch plate or disc for the clutch assembly. The housing can be generally cylindrical with slots or openings arranged substantially parallel to the axis. One problem that can be encountered when the clutch housing is made from a soft material, such as aluminum, is that the spline teeth can become cut and/or chafed by the action of the clutch plate or disc teeth serrated edges. The sheet metal liner can help resolve this issue.

In a clutch having an outer housing and an inner housing arranged coaxially with respect to one another to support a plurality of first and second alternating, interiorly arranged, radially extending, friction members for axial movement between engaged and disengaged positions, the improvement of the clutch can include an aluminum outer housing having a longitudinally extending cylindrical side wall with a plurality of spline teeth arranged in angularly spaced apart locations and a radially inwardly extending end wall. Each spline tooth can have radial wall portions extending inwardly terminating at a radially inward position and with a circumferential wall portion extending circumferentially between inward positions of the radially inwardly extending wall portions. The radial wall portions and the circumferential wall portion can extend longitudinally with respect to the outer housing. A sheet metal liner can be engaged within the aluminum outer housing and can have a corresponding plurality of spline teeth covers. Each cover can be defined by radial walls extending inwardly and terminating at a radially inward position and with a circumferential wall extending circumferentially between inward positions of the radial walls. The radial walls and circumferential walls can extend longitudinally with respect to the outer housing for protecting the plurality of spline teeth formed on the aluminum outer housing.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 7:
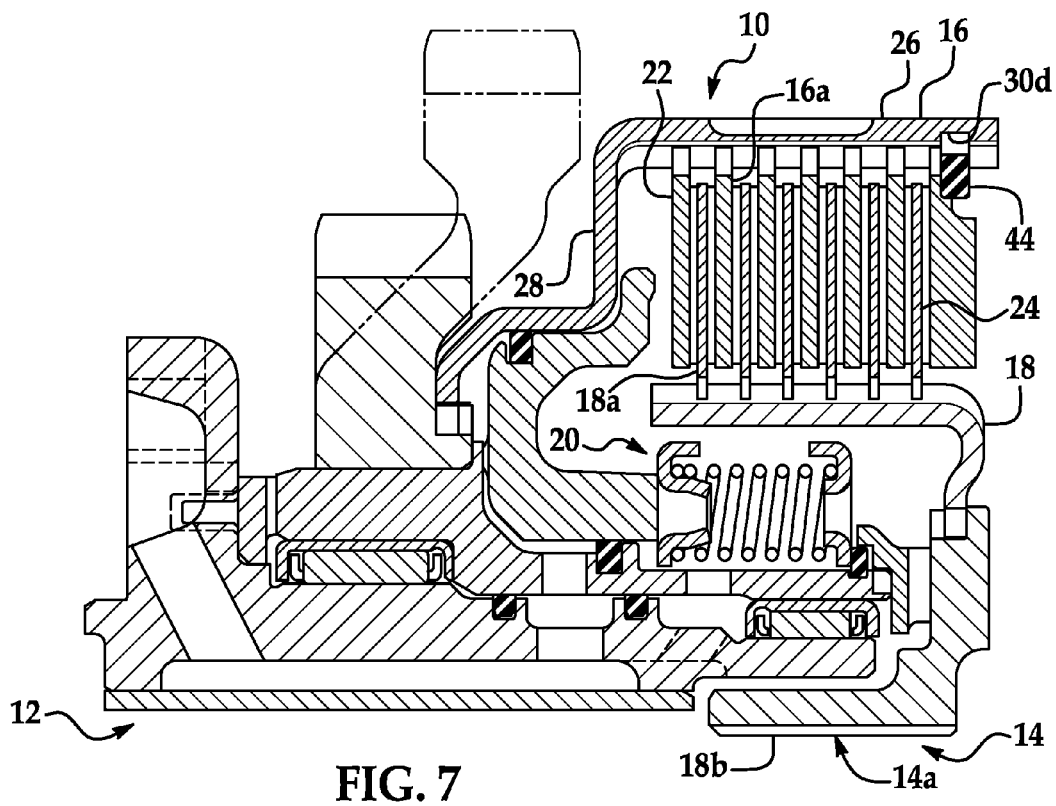
FIG. 7 is a partial cross-sectional view of a power-transmitting clutch having an outer housing and an inner housing for assembly with a plurality of clutch plates or discs extending therebetween.

Referring briefly to FIG. 7, a power-transmitting clutch 10 can include an input shaft 12 and an output shaft 14 rotatable about a common axis. At least three members 16, 18, 20 can be supported thereby in an array of adjacent members spaced along the axis and co-axial with the shafts 12, 14. The outer housing 16 of the members can have plate or disc surfaces 16a facing opposite plate or disc surfaces 18a of one or more intermediate members associated with the inner housing 18. One of the members, such as outer housing 16, can be constrained to rotate with one of the shafts 12, while another of the members, such as inner housing 18, can be constrained to rotate with the other of the shafts 14 while being movable along the common axis. The clutch 10 can also have a mechanism 20 for moving the members toward one another for mutual engagement of the facing surfaces 16a, 18a, whereby the input shaft 12 transmits rotation to the output shaft 14 when the facing surfaces 16a, 18a are mutually engaged. The mechanism 20 can transmit rotational force from an input shaft 12 to an outer housing 16 supported thereby, or can transmit rotational force from another member, such as inner housing 18, to an output shaft 14 that supports the inner housing 18. The mechanism 20 simultaneously permits movement of either member 16, 18 relative to the corresponding supporting shaft 12, 14. The mechanism 20 can include portions integral with or secured to either shaft 12, 14 extending along or parallel to the axis of rotation thereof which portions connect the member 16, 18 to the corresponding supporting shaft 12, 14 for rotation and permit movement only in a direction parallel to the axis. Portions of the gear-like teeth and grooves 14a associated with the inner housing 18 can mate with complementary grooves and teeth 18b in the output shaft 14, which can also be described as ribs or slots in the drum or shaft 12, 14 mating with complementary slots and protrusions associated with at least one of the corresponding housings 16, 18. A plurality of first friction members 22 can be in torque-transmitting connection with an input shaft 12, a plurality of second friction members 24 can be in torque-transmitting connection with an output shaft 14 coaxial with the input shaft 12, and wherein the first and second friction members 22, 24 alternate with one another along the axis of the shafts 12, 14. The clutch 10 can include an outer housing 16 having a longitudinally extending cylindrical side wall 26 and a radially inwardly extending end wall 28.

Figure 1:
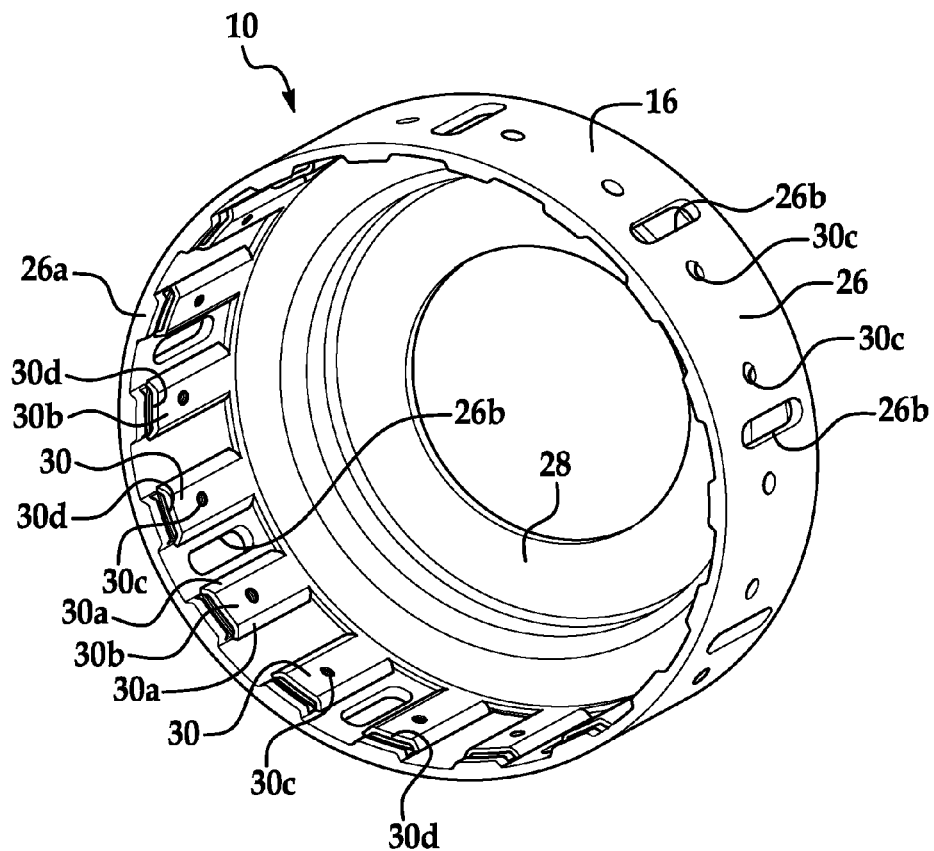
FIG. 1 is a perspective view of an assembly including an aluminum clutch housing having a side wall extending circumferentially with a plurality of angularly spaced apart splines extending longitudinally with respect to a longitudinal axis of the housing and a radially inwardly extending end wall, the clutch housing supporting a sheet metal spline liner to protect the spline teeth.
Figures 2, 3:
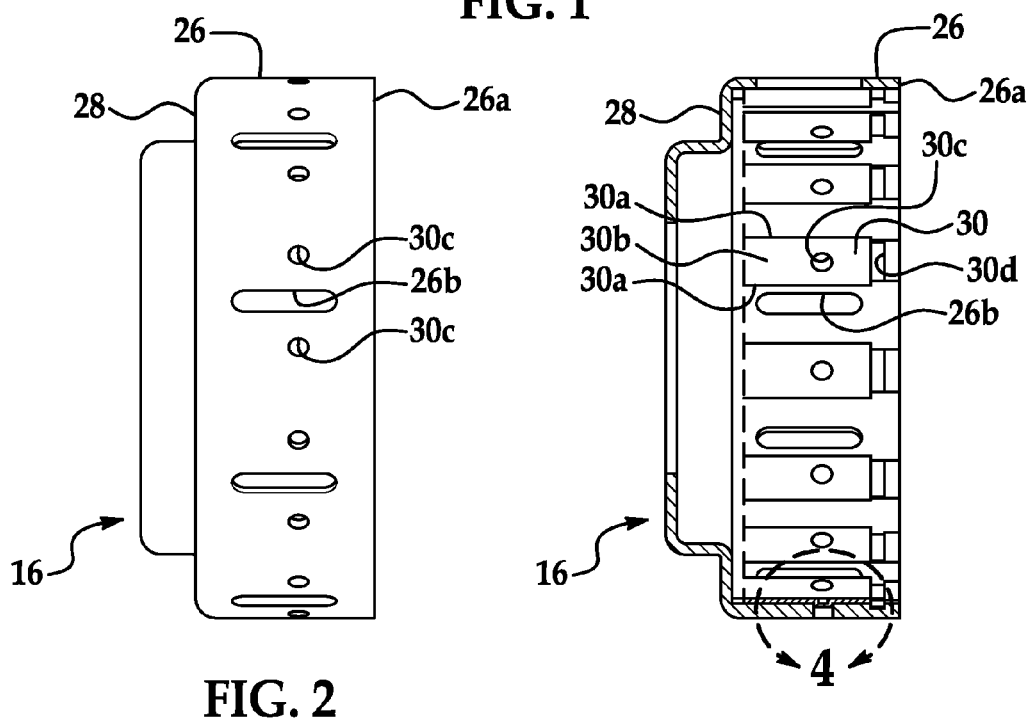
FIG. 2 is a side view of the assembly of FIG. 1.
FIG. 3 is a cross-sectional view of the assembly of FIG. 1.
Figure 4A:
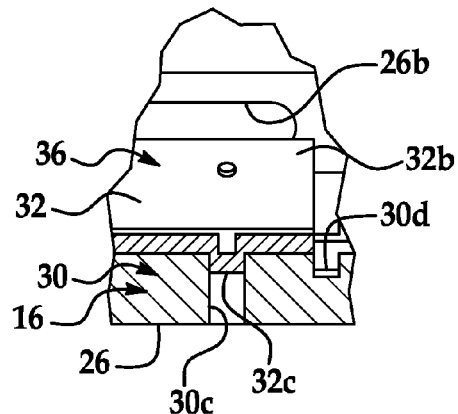
FIG. 4A is a detail view of a connection between the spline liner and the aluminum clutch housing side wall.
Figure 4B:
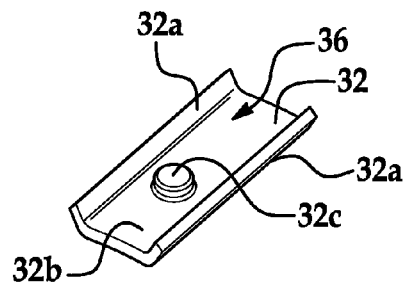
FIG. 4B is a detail view of a surface of the spline liner engageable with the aluminum clutch housing side wall.
Figure 5A:
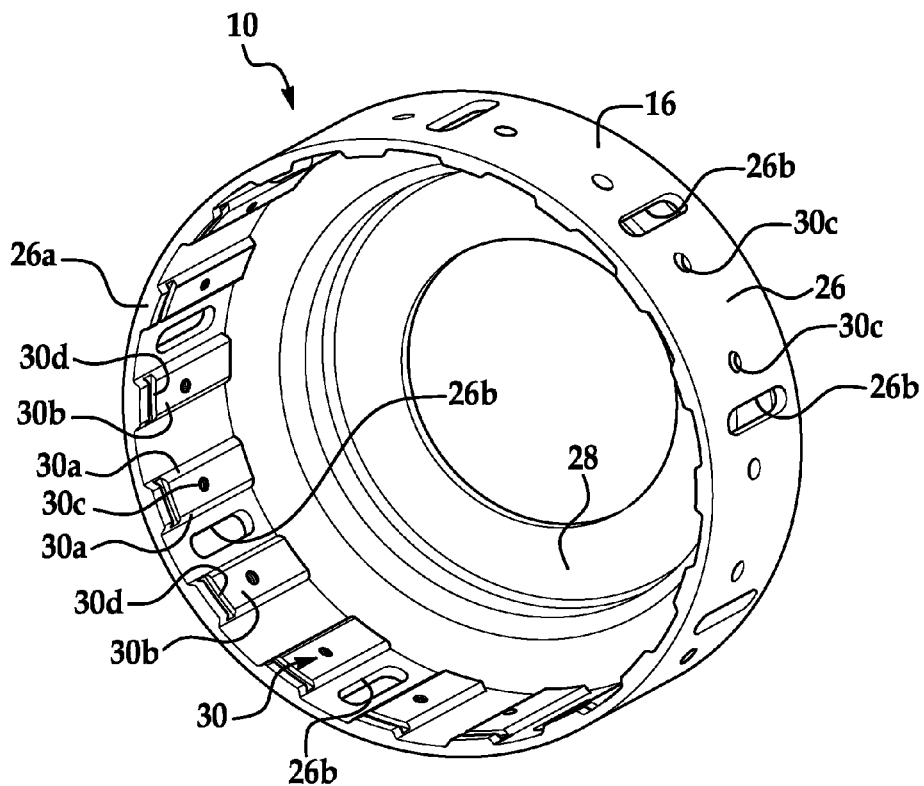
FIG. 5A is a perspective view of the aluminum clutch housing having a side wall with a plurality of angularly spaced splines of FIG. 1.
Figure 5B:
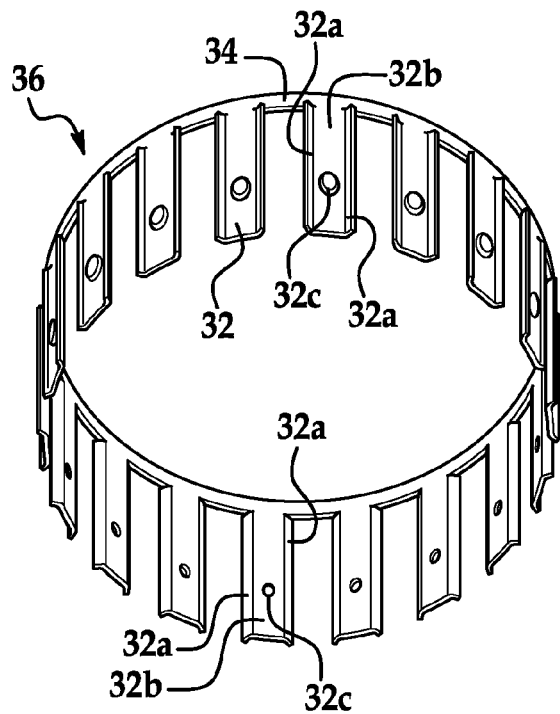
FIG. 5B is a perspective view of the sheet metal spline liner of FIG. 1.

Referring now to FIGS. 1-3, the clutch 10 can include an aluminum metal outer housing 16 having a longitudinally extending, generally cylindrical, side wall 26 and a radially inwardly extending end wall 28. Referring now to FIG. 5A, a plurality of splines 30 can be formed at angularly spaced locations, which can be evenly angularly spaced locations but not necessarily so, along the cylindrical side wall 26. Each spline 30 can have radially inwardly extending wall portions 30a terminating at a radially inner end and with a circumferentially extending wall portion 30b extending between the radially inner ends of the radially extending wall portions 30a. Each spline 30 can extend longitudinally to define radially inwardly extending ribs or protrusions or gear-like teeth 30 of the outer housing 16. Referring now to FIGS. 4A-4B, the inwardly extending spline teeth 30 can include a locking aperture 30c formed in the inner wall portion 30b. A circumferential slot 30d can be formed adjacent an outer end 26a of the inner wall portion 30b of the teeth 30. A snap ring 44, best seen in FIG. 7, can be engageable within the slot 30d for retaining the plurality of first and second alternating, interiorly arranged, radially extending, friction members 22, 24 between the outer and inner housings 16, 18 of the clutch 10 for axial movement between engaged and disengaged positions. Oil ports 26b can be provided in any of the configurations of the outer housing 16 illustrated in FIGS. 1-3, 4A, 5A, and 6A.

Referring now to FIGS. 4A, 4B, 5A, and 5B, a sheet metal liner 36 can have a corresponding plurality of spline teeth covers 32 connected to a collar 34. Each cover 32 can be defined by radial walls 32a extending inwardly and terminating at a radially inward position and with a circumferential wall 32b extending circumferentially between the inward positions of the radial walls 32a. The radial walls 32a and circumferential walls 32b can extend longitudinally with respect to the outer housing 16 for protecting the plurality of spline teeth 30 formed on the aluminum outer housing 16. The sheet metal liner 36 can be engaged within the aluminum outer housing 16 to cover and protect the plurality of spline teeth 30. Each of the plurality of spline teeth covers 32 can have complementary shaped projections 32c to be engaged within a corresponding aperture 30c of the plurality of spline teeth 30 for fastening the spline teeth covers 32 with respect to the spline teeth 30 as best seen in FIG. 4B. The complementary shaped projections 32c can be rivet shaped as illustrated, but not necessarily so.

Figure 6A:
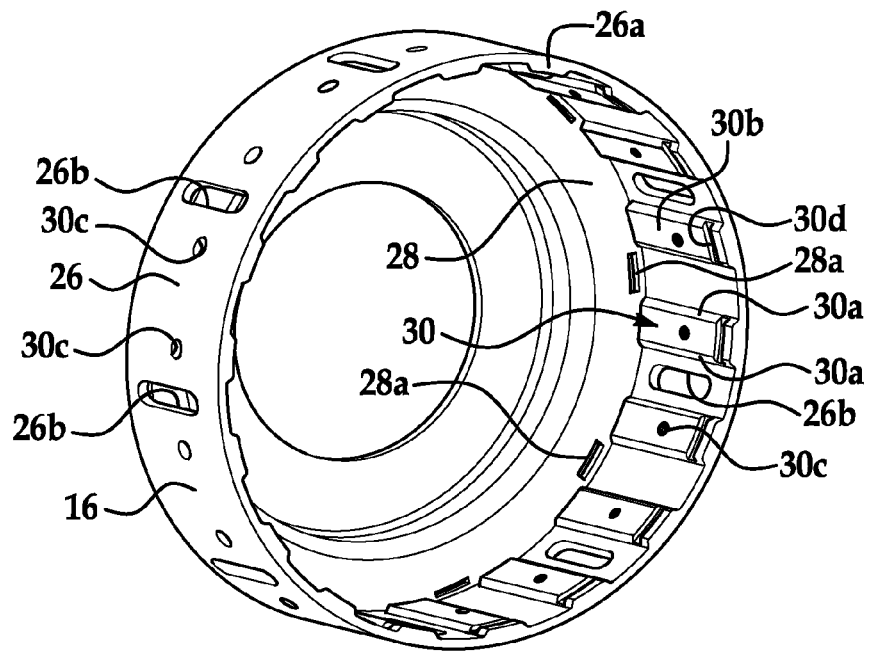
FIG. 6A is a perspective view of the aluminum clutch housing having a splined side wall and apertures formed in an end wall for securing a sheet metal spline liner.
Figure 6B:
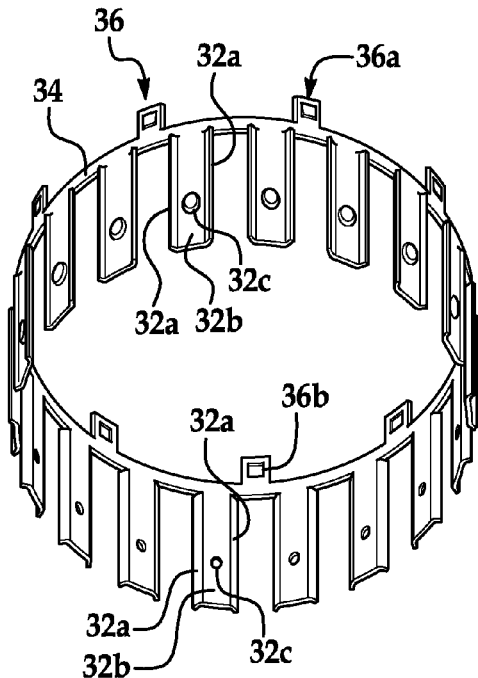
FIG. 6B is a perspective view of the sheet metal spline liner having anchoring tabs extending outwardly for engagement through apertures formed in the end wall of the aluminum clutch housing of FIG. 6A.
Figure 6C:
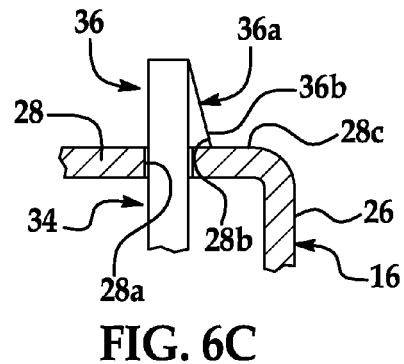
FIG. 6C is a detail view of an anchoring tab passing through an aperture in the end wall of the aluminum clutch housing of FIG. 6A.

Referring now to FIGS. 6A-6C, the configuration of the outer housing 16 and in the inner housing 18 are identical to that described above with the following variations. The outer housing 16 can have a plurality of angularly spaced apertures 28a extending through the end wall 28. The sheet metal liner 36 can have a corresponding plurality of outwardly projecting tabs 36a engageable through the angularly spaced apertures 28a in the end wall 28 of the outer housing 16 for fastening the sheet metal liner 36 with respect to the outer housing 16. The tabs 36a can have a snap retention portion 36b for engaging an edge 28b of an opposite side 28c of the end wall 28 defining the aperture 28a to retain the sheet metal liner 36 in place with respect to the outer housing 16, as best seen in FIG. 6C. The outer housing 16 can have a plurality of oil ports 26b formed in the side wall 26 located between adjacent spline teeth 30. The tabs 36a and apertures 28a can be located to be aligned with the oil ports 26b. The retention tabs 36a and apertures 28a can be provided either in addition to, or in place of, the complementary interlocking projections 32c and apertures 30c best seen in FIGS. 4A and 4B.

In summary, a sheet metal liner 36 can be provided to protect the spline teeth 30 of the aluminum housing 16. The liner 36 can be operatively arranged to accept at least a portion of a clutch plate or disc 22, 24 for the clutch assembly 10. The housing 16 can be generally cylindrical 26 with slots or openings or oil ports 26b arranged substantially parallel to the axis. With the clutch housing 16 made from a soft material, such as aluminum, the spline teeth 30 can become cut and/or chafed by the action of the serrated edges of the teeth of the clutch plate or disc 22, 24. The sheet metal liner 36 can help reduce or eliminate the cutting and/or chafing action of the clutch plate or disc 22, 24 against the aluminum material splines of the outer housing.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a clutch having an outer housing and an inner housing arranged coaxially with respect to one another to support a plurality of first and second alternating, interiorly arranged, radially extending, friction members for axial movement between engaged and disengaged positions, the improvement of the clutch comprising:

an aluminum outer housing having a longitudinally extending cylindrical side wall with a plurality of spline teeth arranged in angularly spaced apart locations and a radially inwardly extending end wall, each spline tooth having radial wall portions extending inwardly terminating at a radially inward position at a circumferential wall portion extending circumferentially between the radially inwardly extending wall portions, the radial wall portions and the circumferential wall portion extending longitudinally with respect to the outer housing, the outer housing having a plurality of angularly spaced apertures extending through the end wall; and a sheet metal liner engageable within the aluminum outer housing and having a corresponding plurality of spline teeth covers, each cover defined by radial walls extending inwardly and terminating at a radially inward position at a circumferential wall extending circumferentially between the radial walls, the radial walls and circumferential walls extending longitudinally with respect to the outer housing for protecting the plurality of spline teeth formed on the aluminum outer housing, the sheet metal liner having a corresponding plurality of outwardly projecting tabs engageable through the angularly spaced apertures in the end wall of the outer housing for fastening the sheet metal liner with respect to the outer housing.

2. The improvement of claim 1 further comprising:
the plurality of spline teeth having a circumferential slot formed adjacent an outer end of the outer housing opposite from the end wall; and
a snap ring engageable within the circumferential slot for retaining the plurality of first and second alternating, interiorly arranged, radially extending, friction members.

3. The improvement of claim 1 further comprising:
each of the plurality of spline teeth having an aperture formed therein; and
each of the plurality of spline teeth covers having complementary shaped projections engageable within a corresponding aperture of the plurality of spline teeth for fastening the spline teeth covers with respect to the spline teeth.

4. The improvement of claim 3, wherein the complementary shaped projections are rivet shaped.

5. The improvement of claim 1 further comprising:
the tabs having a snap retention portion for engaging an edge of an opposite side of the end wall defining the aperture to retain the sheet metal liner in place with respect to the outer housing.

6. The improvement of claim 1 further comprising:
the outer housing having a plurality of oil ports formed in the side wall located between adjacent spline teeth.

7. The improvement of claim 1 further comprising:
the sheet metal liner having a cylindrical collar connecting the plurality of spline teeth covers to one another defining a single unitary member, the plurality of outwardly projecting tabs connected to the cylindrical collar spaced longitudinally from the spline teeth covers.

8. A clutch assembly comprising:
an aluminum outer housing having a longitudinally extending cylindrical side wall with a plurality of spline teeth arranged in angularly spaced apart locations and a radially inwardly extending end wall, each spline tooth having radial wall portions extending inwardly terminating at a radially inward position at a circumferential wall portion extending circumferentially between the radially inwardly extending wall portions, the radial wall portions and the circumferential wall portion extending longitudinally with respect to the outer housing, the outer housing having a plurality of angularly spaced apertures extending through the end wall; and
a sheet metal liner engageable within the aluminum outer housing and having a corresponding plurality of spline teeth covers, each cover defined by radial walls extending inwardly and terminating at a radially inward position at a circumferential wall extending circumferentially between the radial walls, the radial walls and circumferential walls extending longitudinally with respect to the outer housing for protecting the plurality of spline teeth formed on the aluminum outer housing, the sheet metal liner having a corresponding plurality of outwardly projecting tabs engageable through the angularly spaced apertures in the end wall of the outer housing for fastening the sheet metal liner with respect to the outer housing.

9. The clutch assembly of claim 8 further comprising:
the plurality of spline teeth having a circumferential slot formed adjacent an outer end of the outer housing opposite from the end wall; and
a snap ring engageable within the circumferential slot for retaining first and second alternating, interiorly arranged, radially extending, friction members.

10. The clutch assembly of claim 8 further comprising:
each of the plurality of spline teeth having an aperture formed therein; and
each of the plurality of spline teeth covers having complementary shaped projections engageable within a corresponding aperture of the plurality of spline teeth for fastening the spline teeth covers with respect to the spline teeth.

11. The clutch assembly of claim 10, wherein the complementary shaped projections are rivet shaped.

12. The clutch assembly of claim 8 further comprising:
the tabs having a snap retention portion for engaging an edge of an opposite side of the end wall defining the aperture to retain the sheet metal liner in place with respect to the outer housing.

13. The clutch assembly of claim 8 further comprising:
the outer housing having a plurality of oil ports formed in the side wall located between adjacent spline teeth.

14. The improvement of claim 8 further comprising:
the sheet metal liner having a cylindrical collar connecting the plurality of spline teeth covers to one another defining a single unitary member, the plurality of outwardly projecting tabs connected to the cylindrical collar spaced longitudinally from the spline teeth covers.

15. A clutch assembly comprising:
an aluminum outer housing having a longitudinally extending cylindrical side wall with a plurality of spline teeth arranged in angularly spaced apart locations and a radially inwardly extending end wall, each spline tooth having radial wall portions extending inwardly terminating at a radially inward position at a circumferential wall portion extending circumferentially between the radially inwardly extending wall portions, the radial wall portions and the circumferential wall portion extending longitudinally with respect to the outer housing, each of the plurality of spline teeth having an aperture formed therein, a circumferential slot formed in the plurality of spline teeth adjacent an outer end of the outer housing opposite from the end wall for receiving a snap ring, the outer housing having a plurality of angularly spaced apertures extending through the end wall, the outer housing having a plurality of oil ports formed in the side wall located between adjacent spline teeth; and a sheet metal liner engageable within the aluminum outer housing and having a corresponding plurality of spline teeth covers, each cover defined by radial walls extending inwardly and terminating at a radially inward position at a circumferential wall extending circumferentially between the radial walls, the radial walls and circumferential walls extending longitudinally with respect to the outer housing for protecting the plurality of spline teeth formed on the aluminum outer housing, each of the plurality of spline teeth covers having complementary shaped projections engageable within the corresponding aperture of the plurality of spline teeth for fastening the spline teeth covers with respect to the spline teeth, the sheet metal liner having a corresponding plurality of outwardly projecting tabs engageable through the angularly spaced apertures in the end wall of the outer housing for fastening the sheet metal liner with respect to the outer housing, the tabs having a snap retention portion for engaging an edge of an opposite side of the end wall defining the aperture to retain the sheet metal liner in place with respect to the outer housing.

16. The improvement of claim 15 further comprising:

the sheet metal liner having a cylindrical collar connecting the plurality of spline teeth covers to one another defining a single unitary member, the plurality of outwardly projecting tabs connected to the cylindrical collar spaced longitudinally from the spline teeth covers.

* * * * *